United States Patent [19]

Rennolds

[11] 3,811,942

[45] May 21, 1974

[54] PHOSPHORUS-MODIFIED FERROMAGNETIC CHROMIUM DIOXIDE

[75] Inventor: Philip Jackson Rennolds, Wilmington, Del.

[73] Assignee: E. I. duPont de Nemours and Company, Wilmington, Del.

[22] Filed: Dec. 28, 1971

[21] Appl. No.: 212,988

[52] U.S. Cl. .............................. 117/235, 252/62.51

[51] Int. Cl. .............................. C01g 37/02

[58] Field of Search .................. 252/62.51; 423/607; 117/235

[56] References Cited

UNITED STATES PATENTS

| | | | |
|---|---|---|---|
| 3,547,823 | 12/1970 | Mihara et al. | 252/62.51 |
| 3,547,824 | 12/1970 | Mihara et al. | 252/62.51 |
| 3,583,917 | 6/1971 | Mihara et al. | 252/62.51 |
| 3,034,988 | 5/1962 | Ingraham et al. | 252/62.51 |
| 3,686,031 | 8/1972 | Balthis | 252/62.51 X |

*Primary Examiner*—Edward J. Meros
*Assistant Examiner*—J. Cooper

[57] ABSTRACT

Ferromagnetic chromium dioxide of selected coercivity having a rutile-type tetragonal crystal structure in which a controlled amount of phosphorus is included as an integral part of the crystal structure is provided by reacting a mixture comprising at least one compound of chromium combined with oxygen having a valence other than four, phosphorus or a phosphorus-containing compound, and water at an elevated temperature.

10 Claims, 2 Drawing Figures

PATENTED MAY 21 1974 3,811,942

PHOSPHORUS-MODIFIED FERROMAGNETIC CHROMIUM DIOXIDE

BACKGROUND OF THE INVENTION

1. Field of the Invention

This invention relates to ferromagnetic materials and their preparation. More particularly, it relates to a new type of ferromagnetic chromium dioxide, to methods for its preparation, and to magnetic recording members having this new type of ferromagnetic chromium dioxide as the magnetic component.

2. Description of the Prior Art

The preparation of ferromagnetic chromium dioxide and the use of this material to make magnetic recording members have been described extensively in the art. For example, U.S. Pat. Nos. 2,956,955 and 3,278,263 describe the preparation of chromium dioxide characterized by a high degree of purity, uniform small particle size, and excellent magnetic properties. Other patents, e.g., U.S. Pat. Nos. 2,885,365, 2,923,683, 2,923,684, 2,923,685, 3,034,988 and 3,068,176, disclose and claim the incorporation of a variety of modifying agents in the basic $CrO_2$ crystal structure for the purpose of enhancing the magnetic properties of the product.

It has been found that, in general, the ferromagnetic chromium dioxides most suitable for magnetic recording applications have a tetragonal crystal structure of the rutile type, a uniform small particle size, and uniform particle shape. Especially useful are particles whose average length is not more than 10 microns, and whose aspect ratio, i.e., ratio of length to width, is from 2:1 to about 40:1. Particularly preferred are particles with an average length of less than 1.0 micron and an aspect ratio of from 6:1 to about 40:1. These fine, highly acicular particles are particularly well adapted for use in coating compositions to be applied on film or tape because their elongated shape permits them to be oriented in close relationship during mechanical spreading of the composition in a thin layer on a substrate. Moreover, because the single crystals are single magnetic domains, they contribute to a desirable high degree of resolution of the recorded signal on the magnetic recording member containing them.

These preferred prior art materials are characterized by having a high coercivity. Many of the patents referred to above have as one of their principal objects the production of high-coercivity oxides, i.e., materials having a coercivity of 400 oersteds or higher, since, in general, a high coercivity is desirable for the manufacture of magnetic recording members. For some uses, however, a more moderate level of coercivity is either adequate or desirable, but the production of moderate-coercivity materials has heretofore been accompanied by the loss of other desirable characteristics. In the prior art processes and products, particle size and coercivity are inversely related, as taught, for example, in U.S. Pat. Nos. 3,034,988 and 3,278,263.

Low and moderate coercivities have heretofore been achieved only at the expense of an increase in particle size to as much as 60 microns or more in length, and a decrease in uniformity of particle size and shape, with an attendant loss of uniformity in magnetic properties and of homogeneity of dispersions used in preparing magnetic recording members. Quality of recorded signal also suffers for two reasons. First, the larger particles cannot be packed as closely together as the smaller ones, hence, distribution of magnetic susceptibility over the surface of a recording member is not uniform, and the ratio of signal strength to background noise is adversely affected. Second, as their size increases, the particles become multiple rather than single magnetic domains, with a consequent loss in resolution or sharpness of the recorded signal.

There exists, therefore, a need for ferromagnetic chromium dioxides that exhibit only moderate coercivity, e.g., up to about 300 oersteds, while retaining a desirable fine particle size of less than 2 microns in length, and for a method for the manufacture of such ferromagnetic chromium dioxides. More broadly, the need is for ferromagnetic chromium dioxides (and methods for making them) whose coercivity can be controlled independently of particle length and particle aspect ratio.

SUMMARY OF THE INVENTION

This invention in its broader aspects relates to ferromagnetic chromium dioxides having a tetragonal crystal structure of the rutile type and containing 58.0 to 61.9 percent by weight chromium and, as an integral part of the crystal structure, about 0.002 percent to about 1 percent by weight of phosphorus, the chromium and the phosphorus being combined with oxygen, and to processes for making such ferromagnetic oxides.

The process of the invention is a process in which a phosphorus-modified chromium(IV) oxide is prepared by reacting, at a temperature of 250° to 500°C. and under a pressure of 1 to 3,000 atmospheres for a period of 1/10 to 60 hours or more, a reaction mixture comprising (a) at least one compound of chromium combined with oxygen wherein the chromium has a valence other than four, (b) a phosphorus-containing compound to the extent of 0.002 percent to 1.5 percent by weight of phosphorus based on the weight of the chromium oxide (a), and (c) water, to form a phosphorus-modified chromium(IV) oxide containing about 0.002 percent to about 1 percent by weight of phosphorus as an integral part of the crystal structure.

By the practice of this invention, ferromagnetic chromium dioxides can be made at a wide range of useful coercivities without sacrifice of the most desirable characteristics of particle size, as expressed by both length and axial ratio. The ferromagnetic chromium dioxides of this invention are widely useful for magnetic recording members of various kinds, such as tapes, drums, records, memory cores, and the like, wherein by combination of controllable small particle size with controllable coercivity, the clarity of the recorded signal and the signal-to-noise ratio of the recording member are enhanced.

Figure 1:
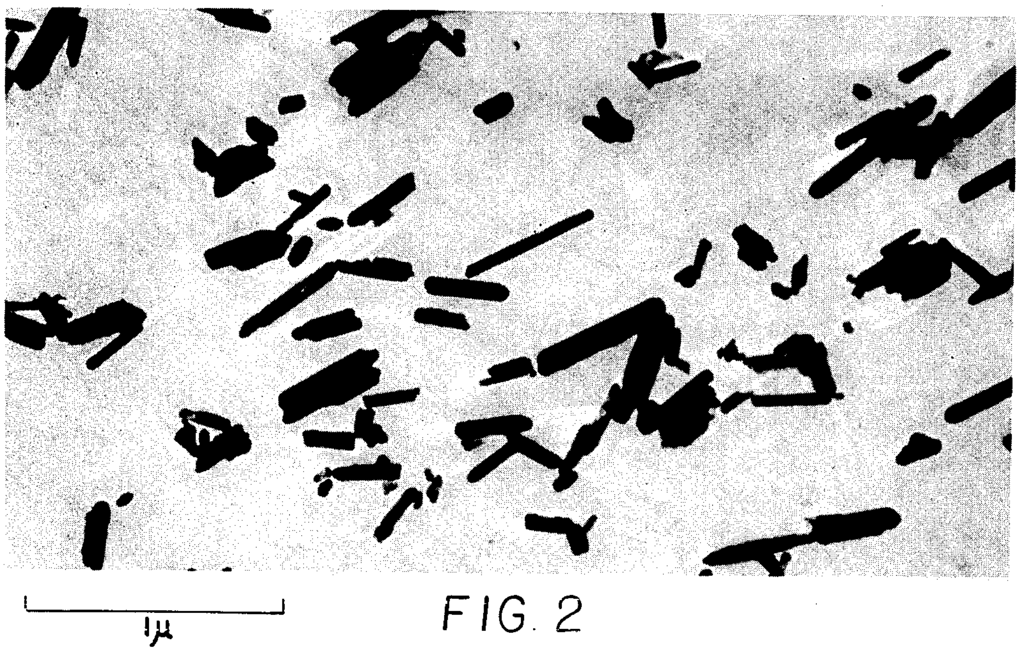
FIG. 1 represents an electronmicrograph at 50,000X magnification of a modified ferromagnetic chromium dioxide composition of this invention.

The drawings will be discussed and compared more fully in connection with the examples hereinafter.

DESCRIPTION OF THE PREFERRED EMBODIMENTS

The preferred product of this invention is a ferromagnetic chromium dioxide having a tetragonal crystal structure of the rutile type containing 58.0 to 61.9 percent by weight chromium, and having an average particle length of not more than two microns, with no more than 10 percent of the particles longer than two microns, a particle length/width ratio of 1:1 to 20:1, an intrinsic coercive force of 50 to 650 oersteds, and a saturation induction of at least 55 electromagnetic units per gram; characterized by containing as an integral part of the crystal structure about 0.002 percent to about 1 percent by weight of phosphorus. The crystal structure is substantially free of metals, other than chromium, which have an atomic number of 22 to 28. The chromium and phosphorus are combined with oxygen. In another embodiment, the crystal structure may also contain from about 0.05 to about 2.5 percent by weight of antimony combined with oxygen.

One preferred embodiment of the process comprises heating a chromium(VI) oxide (i.e., chromium trioxide, $CrO_3$) with a phosphorus-containing compound, the phosphorus-containing compound being present in an amount to provide about 0.002–0.85 percent by weight of phosphorus on the weight of the $CrO_3$, at a temperature of 250°–500°C., under a pressure of 1–3,000 atmospheres, in the presence of water (e.g., 0.1 to 5.0 times the weight of the $CrO_3$) and in the presence of antimony or an antimony-containing compound (e.g., 0.05–2.5 percent Sb based on the weight of the $CrO_3$), for a period of 0.1–60 hours or more. Particularly preferred conditions are a temperature of 270°–350°C., a pressure of 300–600 atmospheres, and a heating period of 1–30 hours.

Another preferred embodiment employs two chromium compounds, in each of which the valence of the chromium is other than four. A chromium(III) compound is heated with a chromium(VI) compound (i.e., chromium trioxide, $CrO_3$) and with a source of phosphorus, the phosphorus being present in an amount of about 0.003–1.5 percent by weight of the $CrO_3$, in the presence of water (e.g., 1–300 percent by weight of the chromium(III) compound), at 250°–500°C. and at 1–3,000 atmospheres for a period of 0.1–60 hours or more. Particularly preferred conditions are a temperature of 270°–350°C., a pressure of 200–600 atmospheres, and a heating period of 1–30 hours.

In still another preferred embodiment, a chromium(III) compound is heated with a source of phosphorus, the phosphorus being present in an amount of about 0.002–1 percent by weight of the chromium(III) compound, and with an oxidizing agent other than chromium trioxide, at the time, temperature, pressure, and water conditions described in the immediately preceding paragraph.

For the second and third process embodiments just described, i.e., those that involve oxidation of a chromium(III) compound, suitable chromium(III) compounds that may be used are chromium oxide ($Cr_2O_3$) and hydrated forms thereof, and chromium hydroxide and hydrated forms thereof. Suitable other oxidizing agents include oxygen and hydrogen peroxide. The oxidizing agent should be present at least in an amount to provide one-half an atomic equivalent of oxygen for each atomic equivalent of Cr(III).

Suitable phosphorus-containing compounds for use in any of the process embodiments are inorganic phosphorus compounds containing (a) phosphorus and oxygen; (b) phosphorus, oxygen, and hydrogen or Na or K; or (c) P, O, H and an alkali metal, e.g., Na or K, or an alkaline earth metal, e.g., Mg or Ca; as well as organic or inorganic compounds which contain phosphorus in any valence state or phosphorus compounds which will hydrolyze or oxidize to phosphorus oxy-anions, optionally also containing hydrogen. Instead of phosphorus-containing compounds, elemental phosphorus may be used as the source of the added phosphorus. In addition to the compounds specifically illustrated in the examples hereinafter, an illustrative but by no means exhaustive list of suitable compounds includes phosphorus halides; phosphorus sulfides, arsenides, and the like; quaternary phosphonium salts, e.g., tetramethyl phosphonium iodide; alkyl and aryl phosphites, phosphates, and phosphamides; alkane phosphonic acids [e.g., $CH_3PO(OH)_2$] and mono- and di-alkane phosphinic acids and the esters and amides thereof as well as their aromatic analogs.

In so far as is consistent with providing chromium dioxide of decreased coercivity, other modifiers may also be incorporated in the products and processes of this invention. Certain modifying agents may be selected from those found in U.S. Pat. Nos. 2,885,365, 2,923,683, 2,923,684, 2,923,685, and 3,068,176. Additional modifying agents, when present, may be employed in amounts indicated in those patents.

Prior to their use in magnetic recording members, the modified ferromagnetic chromium dioxides of this invention may be given suitable after-treatments, such as the heat treatment of U.S. Pat. No. 3,529,930 and the stabilizing treatment of U.S. Pat. No. 3,512,930.

The modified $CrO_2$ of this invention can be incorporated in magnetic recording members by techniques well known to those skilled in the art. In general, these techniques involve combining the ferromagnetic $CrO_2$, an organic binder, a solvent for the binder, and such other adjuvants as lubricants and plasticizers to form a magnetic composition that is then coated on a substrate or formed into a self-supporting member, and, while the composition is still fluid, passed through a magnetic field to orient the magnetic particles. These techniques are described and a wide variety of suitable materials are disclosed, for example, in Spratt, "Magnetic Tape Recording", Heywood and Company, Limited, London (1958); Athey, "Magnetic Tape Recording", NASA SP-5038, National Aeronautics and Space Administration, Washington (1966); and Pear, "Magnetic Recording in Science and Industry", Reinhold Publishing Corporation, New York (1967). A representative list of suitable binders is given in U.S. Pat. No. 3,512,930 and in the references mentioned therein. Among the base materials that may be used are nonmagnetic metal sheets, plates, discs, drums, and the like, and previously prepared films, sheets, or tapes made from any of a number of organic polymeric materials having suitable characteristics of strength, dimensional stability, surface friction, and the like, e.g., films of cellulose acetate or of polyethylene terephthalate.

Magnetic properties which are particularly important are the intrinsic coercive force ($H_{ci}$), saturation per gram ($\sigma_s$), retentivity or remanence per gram ($\sigma_r$), and the ratio of the remanence to the saturation ($\sigma_r/\sigma_s$). Retentivity and saturation are defined on pages 5–8 of Bozorth's "Ferromagnetism," D. Van Nostrand Company, New York (1951). The sigma values reported herein are determined in a field of 4,400 oe. on apparatus similar to that described by T. R. Bardell on pages 226–228 of "Magnetic Materials in the Electrical Industry," Philosophical Library, New York (1955). The definition of intrinsic coercive force, $H_{ci}$, is given in Special Technical Publication No. 85 of the American Society for Testing Materials entitled "Symposium on Magnetic Testing" (1948), pages 191–198. The values for the intrinsic coercive force given herein are determined on a DC ballistic-type apparatus which is a modified form of the apparatus described by Davis and Hartenheim in the Review of Scientific Instruments, 7, 147 (1936).

Figure 2:
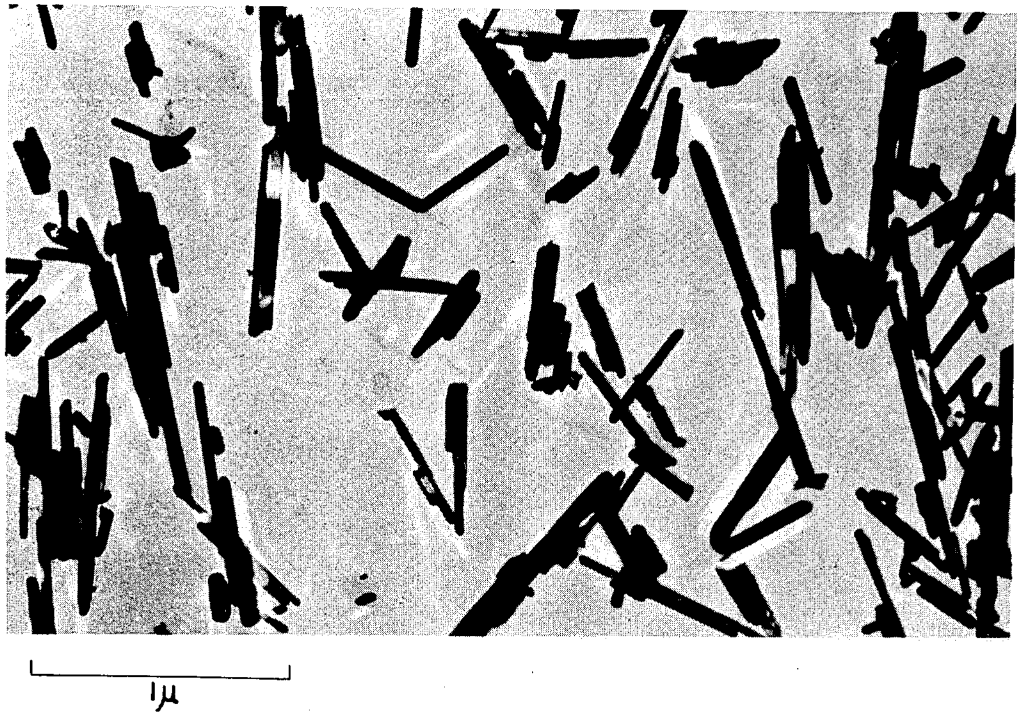
FIG. 2 represents an electronmicrograph at 50,000X magnification of a prior art ferromagnetic chromium dioxide composition.

Particle size and particle size distribution may be determined by actual measurement of a statistically representative number of samples in appropriately magnified representation, e.g., electronmicrographs such as FIGS. 1 and 2. The data on length and aspect ratio given herein were determined in this manner. Alternatively, as pointed out in U.S. Pat. No. 3,278,263, particle size may be conveniently measured by determining surface area. Desirable products will have a specific surface area above 5 square meters per gram, and the preferred products will have specific surface areas approximating 15 square meters per gram or more. Values for specific surface area given herein were determined by the nitrogen-adsorption method of Brunauer, Emmett and Teller according to the procedure described in "Scientific Glassblowing and Laboratory Techniques," by W. E. Barr and Victor J. Anhorn, Instruments Publishing Company, Pittsburgh, Pa. (1949), Chapter XII, pages 257–283.

The following examples will illustrate the present invention and compare it with the prior art, but are not intended to limit the invention. All parts and percentages are by weight unless otherwise noted. In all of the examples, the final modified $CrO_2$ products contained 58.0 to 61.9 percent chromium.

EXAMPLE I

Hydrous chromic oxide ($Cr_2O_3{\cdot}xH_2O$, where $x$ is equal to or greater than 9) was prepared by methods known in the art, such as those described, for example, in U.S. Pat. No. 3,278,263, then dried by heating in air for 2 hours at 630°C. Four parts of the dried material, eight parts of chromium trioxide ($CrO_3$), 0.015 part of sodium dihydrogen orthophosphate ($NaH_2PO_4{\cdot}H_2O$) and three parts of distilled water were stirred together to form a well-mixed viscous paste. The phosphate addition was equivalent to 0.042 percent phosphorus by weight on the weight of the $CrO_3$ used. The paste was placed in a bag fashioned from a commercially available 0.003-inch-thick film made from polytetrafluoroethylene. The bag was sealed, and placed in a stainless steel tube for mechanical support. The tube, bag and contents were then placed in a pressure vessel and subjected to a pressure of 250 atmospheres of argon. The temperature was then raised from room temperature to 250°C. in 70 min., held at 250°C. for 30 minutes, raised in stages to 270°, 290°, and 310°C. at a rate of 20° in 15 minutes with a 30-minute hold period at each of those temperatures, raised from 310° to 350°C. in 10 minutes, and held at 350°C. for 3 hours. As temperature rose, pressure also increased, but was held at 520 ±20 atmospheres by manually controlled venting of the pressure vessel. After cooling, the reaction mixture was removed from the bag, slurried in distilled water in a blender, filtered, washed, and air-dried. The product was a phosphorus-modified ferromagnetic chromium dioxide of this invention in the form of a highly crystalline, lustrous gray, magnetic powder found by chemical analysis to contain 60.6 percent chromium and 0.031 percent phosphorus. The fact that analysis shows the presence of phosphorus in the product, even after vigorous slurrying action in a blender and subsequent washing, is indicative that the modifying element is incorporated integrally in the crystal lattice. The individual particles, seen at 50,000X magnification in FIG. 1, were acicular with an average length of 0.23 $\mu$, an average aspect ratio of 4.1, and a specific surface area of 16.7 m²/g. Magnetic properties of the product were: $H_{ci}$ = 340 oersteds, $\sigma_s$ = 81.2 emu/g, $\sigma_r$ = 34.9 emu/g, $\sigma_r/\sigma_s$ = 0.43. X-ray powder diffraction analysis showed rutile $CrO_2$ as the only crystalline phase.

For comparative purposes, this example was repeated, except that the $NaH_2PO_4{\cdot}H_2O$ was omitted from the reaction mixture. The final product was an unmodified ferromagnetic chromium dioxide composition, representative of the prior art, having a chromium content of 61.06 percent. FIG. 2 shows an electronmicrograph (50,000X magnification) of the individual particles, which are seen to be highly acicular. The particles were found to have an average length of 0.34 $\mu$, an aspect ratio of 8.4, a specific surface area of 21.1 m²/g, an intrinsic coercive force ($H_{ci}$) of 530 oersteds, a saturation ($\sigma_s$) of 83.2 emu/g, a remanence ($\sigma_r$) of 40.5 emu/g, and remanence ratio ($\sigma_r/\sigma_s$) of 0.49. From comparison of this material with that produced in Example I, it will be seen that incorporation of a small amount of phosphorus according to the present invention resulted in a significant decrease in coercivity without serious alteration of other magnetic properties, and without a corresponding increase in particle size.

EXAMPLES II–IV

These Examples were made by the general procedures of Example I and employed the same starting materials as Example I except that the hydrous chromic oxide as dried at 500°C. These Examples further illustrate the effect of phosphorus-modification of ferromagnetic $CrO_2$ compositions. The incorporation of the phosphorus was accomplished, as in Example I, by the addition of $NaH_2PO_4{\cdot}H_2O$ to the reaction mixtures, in amounts calculated to give the phosphorus contents, as percentage by weight of $CrO_3$, indicated in Table 1, which also gives the chemical, physical and magnetic properties of interest for the ferromagnetic $CrO_2$ compositions produced. The data in Table 1 show that, in all cases, the incorporation of the phosphorus modifier resulted in a decrease in coercivity without loss of desirable small particle size and high specific surface area.

TABLE 1

| Example | Added $P/CrO_3$, % | Found $P/CrO_2$, % | Particles: Length, l, $\mu$ | Particles: Aspect Ratio, l/w | Particles: Specific Surface Area, m²/g | Magnetic Properties: $H_{ci}$, oe | Magnetic Properties: $\sigma_s$ emu/g | Magnetic Properties: $\sigma_r$ emu/g | Magnetic Properties: $\sigma_r/\sigma_s$ |
|---|---|---|---|---|---|---|---|---|---|
| Control A | 0 | 0 | 0.35 | 9.3 | 21.0 | 425 | 84.4 | 37.9 | 0.446 |
| II | 0.017 | 0.02 | 0.25 | 5.2 | 20.1 | 364 | 84.5 | 35.5 | 0.420 |
| III | 0.050 | 0.04 | 0.22 | 3.8 | 16.3 | 285 | 83.2 | 30.9 | 0.372 |
| IV | 0.084 | 0.08 | 0.17 | 2.5 | 14.1 | 185 | 83.5 | 24.3 | 0.291 |

EXAMPLES V–XVI

These examples and their associated controls were made by the general procedures of Example I and employed the same starting materials as Example I except that the hydrous chromic oxide was dried at a number of different temperatures, as shown in Table 2. These Examples further illustrate the effect of phosphorus-modification of ferromagnetic $CrO_2$ compositions. The incorporation of the phosphorus was accomplished, as in Example I, by the addition of $NaH_2PO_4 \cdot H_2O$ to the reaction mixtures, in amounts calculated to give the phosphorus contents, as percentage by weight of starting $CrO_3$, indicated in Table 2, which also gives the physical and magnetic properties of interest for the ferromagnetic $CrO_2$ compositions produced.

A further advantage of the invention, illustrated by the data in Table 2, is that it provides a degree of flexibility not heretofore available in the production of ferromagnetic $CrO_2$ compositions of specific desired coercivity and particle size by appropriate selection of process variables. Thus, Examples VI, VIII, and XIV, all having coercivities within the relatively narrow range of 245±5 oersteds, were produced from $Cr_2O_3$ made by drying hydrous chromic oxide at several different temperatures in the range 350° to 700°C. and represented phosphorus additions ranging from 0.038 to 0.071 percent by weight of the $CrO_3$ used in the reaction mixtures.

EXAMPLES XVII–XIX

These examples further illustrate the effect of phosphorus modification of ferromagnetic $CrO_2$ compositions, and in particular they show that the effect is independent of the source of the phosphorus. The general procedures of Example I were followed. The hydrous chromic oxide was dried at 600°C. The phosphorus-containing compounds were incorporated in the reaction mixtures in amounts calculated to give the phosphorus contents, as percentages by weight of $CrO_3$ in the mixtures, indicated in Table 3, which also gives the properties of interest for the ferromagnetic $CrO_2$ compositions produced. As before, the compositions containing phosphorus showed marked reduction in coercivity while retaining desirable particle morphology.

EXAMPLES XX-XXXV

These examples, made like Examples XVII–XIX, show still other levels of phosphorus modification and other source compounds for the phosphorus added to the reaction mixtures. The data in Table 3 and in Table 4, where Control F is repeated for convenient reference, again show that the present invention provides a useful tool for control of coercivity and/or particle dimensions, e.g., Examples XVII, XVIII, XXI, XXIII, and XXIV illustrate a variety of approaches to a $CrO_2$

TABLE 2

| Example | $Cr_2O_3$ Drying Temp., °C. | Added P/$CrO_3$, % | Particles: Length, l, μ | Particles: Aspect Ratio, l/w | Particles: Specific Surface Area, m²/g | Magnetic Properties: $H_{ci}$, oe | $\sigma_s$ emu/g | $\sigma_r$ emu/g | $\sigma_r/\sigma_s$ |
|---|---|---|---|---|---|---|---|---|---|
| Control B | 350 | 0 | 0.17 | 9.6 | 33.8 | 430 | 78.0 | 34.1 | 0.437 |
| V | 350 | 0.055 | — | — | 20.2 | 325 | 81.3 | 32.1 | 0.395 |
| VI | 350 | 0.071 | — | — | 20.3 | 240 | 81.2 | 29.2 | 0.360 |
| Control C | 550 | 0 | — | — | 29.2 | 480 | 82.2 | 38.4 | 0.467 |
| VII | 550 | 0.055 | 0.18 | 3.9 | 21.7 | 300 | 81.4 | 31.3 | 0.385 |
| VIII | 550 | 0.063 | 0.19 | 3.6 | 21.4 | 250 | 82.1 | 29.2 | 0.355 |
| IX | 600 | 0.005 | 0.24 | 5.5 | 22.9 | 420 | 82.7 | 38.4 | 0.464 |
| X | 600 | 0.02 | 0.21 | 5.2 | 19.6 | 380 | 83.1 | 39.7 | 0.454 |
| XI | 600 | 0.10 | 0.11 | 2.1 | — | 175 | 83.0 | 23.1 | 0.278 |
| XII | 600 | 0.50 | — | — | 20.3 | 50 | 57.7 | 6.1 | 0.105 |
| XIII | 600 | 1.00 | — | — | 25.8 | <35 | 39.1 | 1.9 | 0.048 |
| Control D | 700 | 0 | — | — | 11.8 | 301 | 84.2 | 36.5 | 0.434 |
| XIV | 700 | 0.038 | 0.35 | 5.8 | 12.4 | 240 | 85.8 | 31.8 | 0.370 |
| XV | 700 | 1.0 | — | — | — | 204 | 90.2 | 37.7 | 0.418 |
| Control E | 900 | 0 | — | — | 11.1 | 280 | 84.3 | 35.9 | 0.426 |
| XVI | 900 | 0.05 | — | — | — | 195 | 85.3 | 28.3 | 0.332 |

TABLE 3

| Example | Modifier: Source Compound | Modifier: Added P/$CrO_3$, % | Modifier: Found P/$CrO_2$, % | Particles: Specific Surface Area, m²/g | Magnetic Properties: $H_{ci}$, oe | $\sigma_s$ emu/g | $\sigma_r$ emu/g | $\sigma_r/\sigma_s$ |
|---|---|---|---|---|---|---|---|---|
| Control F | — | 0 | 0 | 17.4 | 445 | 84.3 | 39.6 | 0.469 |
| XVII | $KH_2PO_4$ | 0.10 | 0.09 | 13.6 | 175 | 80.9 | 23.3 | 0.288 |
| XVIII | $Ca(H_2PO_4)_2 \cdot H_2O$ | 0.05 | 0.08 | 13.3 | 160 | 88.9 | 23.8 | 0.268 |
| XIX | $Ca(H_2PO_4)_2 \cdot H_2O$ | 0.10 | 0.13 | 14.8 | 56 | 60.7 | 7.2 | 0.119 |

product with a coercivity of 170±10 oersteds and desirable particle size, and Examples XX, XXII, and XXVI illustrate three different reaction mixtures which gave final products with a coercivity of 285 oersteds.

TABLE 4

| Example | Modifier: Source Compound | Modifier: Added P/$CrO_3$, % | Particles: Specific Surface Area, $m^2/g$ | Magnetic Properties: $H_{ci}$, oe | $\sigma_s$ emu/g | $\sigma_r$ emu/g | $\sigma_r/\sigma_s$ |
|---|---|---|---|---|---|---|---|
| Control F | — | 0 | 17.4 | 445 | 84.3 | 39.6 | 0.469 |
| XX | $Na_2HPO_4 \cdot 7H_2O$ | 0.05 | — | 285 | 81.8 | 32.8 | 0.401 |
| XXI | $Na_2HPO_4 \cdot 7H_2O$ | 0.10 | — | 165 | 79.8 | 21.4 | 0.268 |
| XXII | $Na_3PO_4 \cdot 12H_2O$ | 0.05 | 15.1 | 285 | 83.2 | 32.5 | 0.391 |
| XXIII | $Na_3PO_4 \cdot 12H_2O$ | 0.10 | 14.7 | 160 | 80.8 | 21.6 | 0.267 |
| XXIV | $Na_4P_2O_7 \cdot 10H_2O$ | 0.05 | 12.1 | 165 | 83.7 | 23.3 | 0.279 |
| XXV | $Na_4P_2O_7 \cdot 10H_2O$ | 0.10 | 15.1 | 55 | 61.5 | 7.4 | 0.120 |
| XXVI | $KH_2PO_4$ | 0.05 | 17.7 | 285 | 82.0 | 32.8 | 0.400 |
| XXVII | $CrPO_4 \cdot 3H_2O$ | 0.37 | 16.9 | 60 | 60.5 | 7.5 | 0.123 |
| XXVIII | $CrPO_4 \cdot 3H_2O$ | 0.73 | 24.0 | <35 | 53.9 | 5.7 | 0.105 |
| XXIX | $CrPO_4 \cdot 3H_2O$ | 1.00 | — | <25 | 43.7 | 3.8 | 0.087 |
| Control G | 13 | 0 | 23.0 | 430 | 80.0 | 35.4 | 0.442 |
| XXX | $H_3PO_4$ | 0.05 | 18.6 | 280 | 80.4 | 31.1 | 0.388 |
| XXXI | $P_2O_5$ | 0.05 | 18.4 | 240 | 77.7 | 25.9 | 0.344 |
| XXXII | $H_3PO_3$ | 0.05 | 16.8 | 250 | 79.0 | 28.2 | 0.357 |
| XXXIII | $HPF_6$* | 0.05 | 18.1 | 250 | 77.4 | 27.6 | 0.358 |
| XXXIV | $H_3PO_2$ | 0.05 | 16.5 | 240 | 77.6 | 26.2 | 0.338 |
| XXXV | $Na_5P_3O_{10}$ | 0.05 | 20.8 | 290 | 74.7 | 28.4 | 0.381 |

*As $(C_6H_5)_3PF_6$, hydrolyzed in $H_2O$.

EXAMPLES XXXVI–XXXVII

These examples illustrate the effectiveness of phosphorus modification according to this invention in reducing coercivity and particle size of ferromagnetic chromium dioxide compositions (all containing approximately 0.8 percent by weight antimony) of which the properties are given in Table 5. It will be seen that Examples XXXVI and XXXVII containing a phosphorus modifier according to this invention in addition to the antimony modifier of the prior art, showed a marked reduction in coercivity from that of the controls containing only the antimony modifier but showed no undesirable increase in particle size.

TABLE 5

| Example | Added P/$CrO_3$, % | Particles: Specific Surface Area, $m^2/g$ | Magnetic Properties: $H_{ci}$, oe | $\sigma_s$ emu/g | $\sigma_r$ emu/g | $\sigma_r/\sigma_s$ |
|---|---|---|---|---|---|---|
| Control H | 0 | 18.7 | 315 | 78.6 | 29.4 | 0.373 |
| XXXVI | 0.05 | 10.3 | 145 | 80.1 | 21.0 | 0.262 |
| Control K | 0 | 32.0 | 310 | 77.6 | 26.4 | 0.344 |
| XXXVII | 0.05 | 29.5 | 215 | 75.6 | 22.4 | 0.296 |

chromium dioxide compositions, even when they contain another modifier known in the prior art to increase coercivity, specifically, antimony as disclosed in U.S. Pat. No. 2,923,683.

The reaction mixture for Control H consisted of 100 parts $CrO_3$, one part antimony oxide ($Sb_2O_3$), and 10 parts distilled water. For Example XXXVI, illustrating the present invention, the reaction mixture of Control H was modified by the addition of $NaH_2PO_4 \cdot H_2O$ in an amount calculated to give the reaction mixture a phosphorus content of 0.05 percent of the weight of the $CrO_3$. The reaction mixtures for Control K and Example XXXVII were the same, respectively, as those for Control H and Example XXXVI, except that 10 parts of a solution containing 17 percent by weight of nitric acid in distilled water were used in place of distilled water alone. The reaction mixtures were treated by the procedures of Example I to yield the ferromagnetic

EXAMPLE XXXVIII

This example also illustrates a ferromagnetic chromium dioxide modified by both phosphorus and antimony, but made by a different process, namely, the conversion of a chromium(III) compound to modified $CrO_2$ by an oxidizing agent other than chromium trioxide.

Hydrous chromic oxide was dried in a muffle furnace in a stream of oxygen (flow rate = 1 liter per minute) at 350°–355°C for 1 hour. A reaction mixture was made up of 3.5 parts of the dried material, 3.5 parts of 30 percent hydrogen peroxide (1.05 parts active $H_2O_2$), 0.0175 part $Sb_2O_3$, and 0.005 part $Na_3PO_4 \cdot 12H_2O$. The reaction mixture contained 0.012 percent phosphorus by weight on the weight of the chromium(III) compound. The reaction mixture was placed in a platinum tube and chilled in an acetone/dry-ice bath to prevent premature reaction of the hydrogen peroxide, and the tube was then sealed and placed in a pressure vessel. The vessel and its contents were heated to 400°C., the pressure was raised to 3,000 atmospheres of argon, and the reaction was allowed to proceed under these conditions for 2 hours. The product of the reaction was removed from the platinum tube, slurried, filtered, washed and dried as in Example I. The final ferromagnetic modified $CrO_2$ contained 0.011 percent phosphorus and 0.362 percent antimony, both by weight. Magnetic properties of the dried product were: $H_{ci}$ = 50 oersteds, $\sigma_s$ = 70.4 emu/g.

For comparison, the same procedure was repeated, except that the $Na_3PO_4 \cdot 12H_2O$ was omitted from the reaction mixture. The resulting product, representative of the prior art, had the following magnetic characteristics: $H_{ci}$ = 175 oersteds, $\sigma_s$ = 69.8 emu/g. Thus phosphorus modification according to this invention substantially reduced coercivity.

EXAMPLES XXXIX–XLI

The reaction mixtures for Control L and Examples XXXIX–XLI were made initially by the procedure of Example I. Control L contained no phosphorus modifier. The reaction mixtures for Examples XXXIX–XLI contained $NaH_2PO_4 \cdot H_2O$ in amounts calculated to give the phosphorus contents shown in Table 6. The ferromagnetic chromium dioxide compositions obtained by the procedure of Example I were further treated by the reductive stabilization procedure described in Example X of U.S. Pat. No. 3,512,930. The data in Table 6 show that the effect of phosphorus modification according to this invention in reducing both coercivity and particle size is not disturbed by the subsequent treatment.

measured on a tape transport having record and erase heads like those on the Ampex FR–1400 transport (Ampex Corp., Redwood City, Calif.) at a tape speed of 15 inches per second and a signal frequency of 187.5 kHz. Results are given in Table 7, where the output in decibels is given on a relative basis, the control tape being assigned a value of zero and the others being rated as higher (+ db) or lower (– db) output.

TABLE 7

| Example | Added P/CrO₃, % | $H_{ci}$, oe | Specific Surface Area, m²/g | Saturated 80 μ'' Output, Relative db |
|---|---|---|---|---|
| Control A | 0 | 425 | 21.0 | 0 |
| II | 0.017 | 364 | 20.1 | +1.5 |
| III | 0.050 | 285 | 16.3 | –2.5 |

As compared with Control A, Example II shows a substantial drop in coercivity with no significant change in particle size (as inferred from surface area) and with a modest improvement in output. Example III, with a very large reduction in coercivity, shows moderately lower surface area (larger particle size) but still at a preferred level. The loss in output for Example III is surprisingly small when compared with the large drop in coercivity.

EXAMPLES XLII–LIII

The following examples and the data in Table 8 further illustrate that the present invention provides great flexibility in the production of modified ferromagnetic chromium dioxide having a desirable combination of such properties as coercivity, particle size (surface area) and output. The various oxide samples were prepared by the general procedure of Example I and were made into magnetic recording tapes and tested in the manner just described. Table 8 shows the temperature employed for drying the hydrous chromic oxide, as well as the temperature and holding time for the final stage of the reaction of $Cr_2O_3$ and $CrO_3$.

TABLE 6

| Example | Added P/CrO₃, % | Particles: Length, l, μ | Particles: Aspect, Ratio, l/w | Particles: Specific Surface Area, m²/g | Magnetic Properties: $H_{ci}$, oe | Magnetic Properties: $\sigma_s$ emu/g | Magnetic Properties: $\sigma_r$ emu/g | $\sigma_r/\sigma_s$ |
|---|---|---|---|---|---|---|---|---|
| Control L | 0 | 0.28 | 6.0 | 19.1 | 410 | 74.0 | 33.4 | 0.452 |
| XXXIX | 0.02 | — | — | 17.0 | 360 | 65.8 | 22.7 | 0.345 |
| XL | 0.035 | 0.22 | 4.7 | 15.6 | 315 | 70.3 | 28.5 | 0.415 |
| XLI | 0.05 | 0.36 | 3.4 | 15.0 | 275 | 70.4 | 27.1 | 0.385 |

To illustrate some of the advantages of the invention, the chromium dioxides of some of the preceding examples were made into magnetic coating compositions with the aid of suitable solvents, e.g., methyl ethyl ketone and tetrahydrofuran, and coated on a polyethylene terephthalate film base, all by conventional procedures. On a dry basis, the coating compositions contained about 70 percent by weight $CrO_2$ in a binder comprising, approximately, by dry weight, the following commercially available materials:

| | |
|---|---|
| Polyester-polyurethane from diphenylmethane diisocyanate, adipic acid, and a mixture of alkanediols having 2-4 carbon atoms | 45% |
| Vinylidene chloride/acrylonitrile (80/20) copolymer | 45% |
| Soya lecithin | ~10% |
| Polysiloxane oil | <1% |

For the magnetic recording tapes thus prepared, saturation output at a wavelength of 80 microinches was Control M shows that, by prior art methods, low coercivity can be achieved only at the cost of large particle size (low surface area) and low output. Examples XLII–XLVIII show that, by the practice of the present invention, coercivity can be held in the same range while particle size and output are markedly improved.

Control N, a prior art sample, and Examples XLIX–LIII all according to this invention, again illustrate that the present invention provides a way of achieving significant improvement in particle size and output while maintaining essentially constant coercivity. Alternatively, coercivity can be reduced while particle size and output are held at a specified level. Thus, Control N through Example L show a series with coercivity of 405 ±10 oersteds, while Examples LII AND LIII show a group centered at about 440 oersteds. In this latter group, the unusually high surface area (small particle size) is especially remarkable in view of the relatively low coercivity.

In considering the output data, it must be kept in mind that Examples XLII–XLVIII are rated relative to Control M, while Examples XLIX–LIII are rated relative to Control N, and that the 0 rating for Controls M and N does not represent the same base point. In actuality, as would be expected from their higher coercivities, Control N and its related examples rated +19 db relative to Control M and its related examples. The significant observation is that this invention makes possible the manufacture of low-coercivity (~250 oe.) materials with outputs that approximate those of materials having much higher coercivities (~425 oe.).

commercial wide-band instrumentation recorder (Hewlett-Packard 3950, Hewlett-Packard, Mountain View, Calif.), includes:

Biased Output — Bias was set according to the manufacturer's operating and service manual, input was set to give 1 percent third harmonic distortion, and output was read at two wavelengths, 10 milli-inches and 80 $\mu$ inches. Output amplification was adjusted to give a 0 db reading on the output meter for the control sample.

Saturated Output — The bias was removed and the input level was increased to give maximized output at 80 $\mu$ inches recorded wavelength.

Slot Noise — A signal of 0.5 milli-inch wavelength was recorded on the member and played back through a 200 Hz bandpass filter centered at the recorded wavelength, with read-out on a Hewlett-Packard 310A wave analyzer.

Somewhat similar determinations were made at another wavelength on another commercial instrument

TABLE 8

| Example | Added P/CrO$_3$, % | Cr$_2$O$_3$ Drying Temp. °C. | Final Reaction °C. | Final Reaction Hrs. | H$_{ci}$, oe | Specific Surface Area, m$^2$/g | Saturated 80 $\mu$'' Output, Relative db |
|---|---|---|---|---|---|---|---|
| Control M | 0 | 700 | 350 | 3 | 255 | 11.3 | 0 |
| XLII | 0.013 | 900 | 350 | 3 | 250 | 13.3 | +2.5 |
| XLIII | 0.038 | 700 | 350 | 3 | 240 | 12.4 | +11.6 |
| XLIV | 0.041 | 650 | 350 | 3 | 260 | 13.7 | +10.3 |
| XLV | 0.050 | 500 | 350 | 3 | 285 | 16.3 | +15.1 |
| XLVI | 0.046 | 550 | 350 | 3 | 300 | 21.7 | +18.1 |
| XLVII | 0.063 | 550 | 350 | 3 | 250 | 21.4 | +11.0 |
| XLVIII | 0.071 | 350 | 350 | 3 | 240 | 16.5 | +8.5 |
| Control N | 0 | 500 | 350 | 30 | 415 | 20.1 | 0 |
| XLIX | 0.008 | 500 | 350 | 30 | 405 | 20.8 | −3.0 |
| L | 0.018 | 500 | 270 | 6 | 415 | 31.6 | +4.4 |
| LI | 0.026 | 500 | 310 | 3 | 400 | 25.0 | +2.4 |
| LII | 0.003 | 500 | 270 | 6 | 435 | 39.0 | +5.4 |
| LIII | 0.0125 | 500 | 310 | 3 | 445 | 27.9 | +4.4 |

For further testing of performance capabilities, the ferromagnetic oxides of Control L and Examples XXXIX–XLI were made into magnetic recording members in the general manner already described. On a dry weight basis, exclusive of the polyethylene terephthalate supporting film, the magnetic compositions contained approximately 80 percent of the ferromagnetic oxide in a binder made up of the following commercially available materials:

| | |
|---|---|
| Polyester-polyurethane from diphenylmethane diisocyanate, adipic acid, and a mixture of alkanediols having 2-4 carbon atoms | 55% |
| Vinylidene chloride/acrylonitrile (80/20) copolymer | 26% |
| Soya lecithin | 10.2% |
| 2,4-toluene diisocyanate/trimethylolpropane (3/1) | 8% |
| Stearamide | 0.8% |

Table 9 gives the performance data for the magnetic recording members. One set of data, determined on a (Ampex AG–440, Ampex Corp., Redwood City, Calif.) to show:

Output — The manufacturer's operation and maintenance manual was followed to determine biased output of a 8 kHz signal.

S/N — The bias noise was determined by reading machine response with no signal input and recording level set to zero. The difference between 8 kHz biased output and bias noise was recorded as the signal/noise (S/N) value.

For each of the tests, the control sample was arbitrarily given the value of zero and the other examples related to it in terms of + or − db.

It will be seen from Table 9 that, by the practice of this invention, coercivity can be reduced by as much as 100 oe without any significant impairment of output and S/N characteristics, and that still further reduction of coercivity is possible with far less serious effect on output and S/N than was possible by prior art methods of achieving low coercivity.

TABLE 9

| Example | Added P/CrO$_3$, % | H$_{ci}$, oe. | HP-3950 Biased Output 10 mil'' | HP-3950 Biased Output 80 $\mu$'' | HP-3950 Saturated Output 80 $\mu$'' | HP-3950 0.5 mil'' Slot Noise | Ampex AG-440 Biased Output, 8 kHz | Ampex AG-440 S/N |
|---|---|---|---|---|---|---|---|---|
| Control L | 0 | 410 | 0 | 0 | 0 | 0 | 0 | 0 |
| XXXIX | 0.020 | 360 | −0.9 | −1.2 | −1.6 | −1.0 | +0.4 | +0.1 |
| XL | 0.035 | 315 | −1.1 | −0.6 | −2.0 | −1.0 | −0.2 | −0.9 |
| XLI | 0.050 | 275 | −1.1 | −2.4 | −5.0 | −1.5 | −1.8 | −2.3 |

From all the foregoing, it is apparent that the present invention makes possible, by ways not heretofore known, the production of a broad spectrum of modified ferromagnetic chromium dioxides having desirable combinations of properties, especially coercivity and particle size. More particularly, the invention makes possible a preferred group of materials new to the art, wherein low coercivity is achieved without sacrifice of desirable small particle size. This combination of properties makes possible magnetic recording elements of low coercivity without impairment of desirably high levels of recorded signal output and signal-to-noise ratio. Seen more broadly, the invention confers new degrees of freedom in the manufacturing operation, whereby the inclusion of phosphorus modifiers according to this invention opens the way to manipulation of the numerous process variables to give almost any desired combination of properties in the resulting ferromagnetic chromium dioxide product.

The products of this invention are useful for the manufacture of magnetic memory elements, such as magnetic recording tapes, discs, and drums; for ceramic bodies such as magnetic memory cores for computers; and for other magnetic applications, such as microwave attenuators, gyrator elements, electrically operated high-frequency switches, low-loss transformer cores, focusing magnets, magnetic clutches, and the like.

I claim:

1. A ferromagnetic chromium dioxide having a tetragonal crystal structure of a rutile type containing 58.0 to 61.9 percent by weight chromium and about 0.002 to about 1 percent by weight of phosphorus as an integral part of the crystal structure, said crystal structure being substantially free of metals, other than chromium, which have an atomic number of 22 to 28, said chromium dioxide having an average particle length of not more than 2 microns with no more than 10 percent of the particles being longer than 2 microns and a particle length/width ratio of 1:1 to 20:1.

2. A ferromagnetic chromium dioxide as defined in claim 1 having an intrinsic coercive force of 50 to 650 oersteds and a saturation induction of at least 55 electromagnetic units per gram.

3. A ferromagnetic chromium dioxide as defined in claim 2 wherein said crystal structure contains from about 0.05 percent to about 2.5 percent by weight of antimony combined with oxygen in the crystal structure.

4. A magnetic recording member comprising a support bearing a layer of the chromium dioxide defined in claim 1.

5. The process for making a ferromagnetic chromium dioxide which comprises forming rutile-type, tetragonal, phosphorus-containing ferromagnetic chromium dioxide crystals wherein the phosphorus is an integral part of the crystal structure by heating a mixture comprising a chromium(VI) oxide, phosphorus or a phosphorus-containing compound, water and antimony or an antimony-containing compound at 250° to 500°C. and a pressure from 1 to 3,000 atmospheres for a period of 0.1 to 60 hours, the phosphorus or phosphorus-containing compound being present in an amount to provide from about 0.002 percent to about 0.85 percent of phosphorus by weight of the chromium(VI) oxide and the antimony or antimony-containing compound being present in an amount to provide from about 0.05 percent to about 2.5 percent of antimony by weight of the chromium(VI) oxide, said mixture being substantially free of metals, other than chromium, which have an atomic number of 22 to 28.

6. The process according to claim 5 wherein phosphorus is initially present in said mixture as $NaH_2PO_4 \cdot H_2O$.

7. The process for making a ferromagnetic chromium dioxide which comprises forming rutile-type, tetragonal, phosphorus-containing ferromagnetic chromium dioxide crystals wherein the phosphorus is an integral part of the crystal structure by heating a mixture comprising a chromium(III) oxygen-containing compound with a chromium(VI) oxygen-containing compound in the presence of water and a source of phosphorus at 250° to 500°C. and a pressure from 1 to 3,000 atmospheres, the phosphorus being present in an amount from about 0.003 percent to about 1.5 percent by weight of the chromium(VI) compound and the water being present in an amount from 1 to 300 percent by weight of the chromium(III) compound, said mixture being substantially free of metals, other than chromium, which have an atomic number of 22 to 28.

8. The process according to claim 7 wherein phosphorus is initially present in said mixture as $NaH_2PO_4 \cdot H_2O$.

9. The process for making a ferromagnetic chromium dioxide which comprises forming rutile-type, tetragonal, phosphorus-containing ferromagnetic chromium dioxide crystals wherein the phosphorus is an integral part of the crystal structure by heating a mixture comprising a chromium(III) oxygen-containing compound with a source of phosphorus at a temperature of 250° to 500°C. and a pressure of 1 to 3,000 atmospheres in the presence of 1 percent to 300 percent by weight of water based on the chromium compound and in the presence of an oxidizing agent, other than chromium trioxide, for said chromium compound, said phosphorus being present in the mixture in an amount from about 0.002 to about 1 percent by weight of said chromium compound, said mixture being substantially free of metals, other than chromium, which have an atomic number of 22 to 28.

10. A process according to claim 9, wherein the phosphorus is initially present as $NaH_2PO_4 \cdot H_2O$.

* * * * *